United States Patent [19]

Murata

[11] Patent Number: 5,075,777
[45] Date of Patent: Dec. 24, 1991

[54] AUTOMATIC FOCUSING CAMERA WITH AUTOMATIC FOCUSING FUNCTION FOR AUTOMATICALLY MATCHING FOCUS IN RESPONSE TO VIDEO SIGNAL

[75] Inventor: Haruhiko Murata, Moriguchi, Japan

[73] Assignee: Sanyo Electric Co., Ltd., Japan

[21] Appl. No.: 587,405

[22] Filed: Sep. 25, 1990

[30] Foreign Application Priority Data

Sep. 29, 1989 [JP] Japan .................................. 1-255698

[51] Int. Cl.$^5$ .......................................... H04N 5/232
[52] U.S. Cl. ..................... 358/227; 358/228; 354/404
[58] Field of Search ............... 358/227, 226, 224, 225, 358/213.19, 213.13, 228, 213.23, 213.26–213.28; 354/402, 400, 404

[56] References Cited

U.S. PATENT DOCUMENTS

| | | | |
|---|---|---|---|
| 4,409,620 | 10/1983 | Enomoto | 358/228 |
| 4,614,975 | 9/1986 | Kaite | 358/227 |
| 4,638,364 | 1/1987 | Hiramatsu | 358/227 |
| 4,803,550 | 2/1989 | Yabe | 358/228 |
| 4,833,541 | 5/1989 | Takuma et al. | 358/227 |
| 4,841,370 | 6/1989 | Murashima | 358/227 |
| 4,853,788 | 8/1989 | Murashima et al. | 358/227 |
| 4,853,789 | 8/1989 | Murashima et al. | 358/227 |
| 4,858,020 | 8/1989 | Homma | 358/213.26 |
| 4,872,058 | 10/1989 | Baba | 358/227 |
| 4,876,601 | 10/1989 | Hashimoto | 358/213.26 |
| 4,903,134 | 2/1990 | Murashima et al. | 358/227 |
| 4,922,346 | 5/1990 | Hidaka et al. | 358/227 |

FOREIGN PATENT DOCUMENTS

| | | |
|---|---|---|
| 58-505 | 4/1983 | Japan . |
| 161579 | 9/1983 | Japan . |
| 103776 | 6/1985 | Japan . |
| 163475 | 7/1987 | Japan . |
| 63-125910 | 5/1988 | Japan . |

*Primary Examiner*—Howard W. Britton
*Assistant Examiner*—Sherrie Hsia
*Attorney, Agent, or Firm*—Peter L. Michaelson

[57] ABSTRACT

In an electric still camera with an automatic focusing function, when a user operates a releasing switch (21), a focusing operation relative to an object is initiated. During this focusing operation, a CCD (45) is driven by a timing generator (27) in accordance with a first driving method. According to this first driving method, signal charges are read out five times for one field and therefore five focus evaluating values are obtained for one field. These focus evaluating values enable the high speed driving of a focusing motor (3) at the time of focusing operation. After the focusing operation is completed, the CCD (45) is driven by the timing generator (27) in accordance with a second driving method which is a normal driving method, a regular video signal is output from an image sensing circuit 4 and recorded in a video floppy 26.

10 Claims, 7 Drawing Sheets

AUTOMATIC FOCUSING CAMERA WITH AUTOMATIC FOCUSING FUNCTION FOR AUTOMATICALLY MATCHING FOCUS IN RESPONSE TO VIDEO SIGNAL

BACKGROUND OF THE INVENTION

1. Field of the Invention

The present invention relates to an automatic focusing camera and more particularly, to an automatic focusing camera with an automatic focusing function for automatically matching the focus in response to a video signal obtained from an image sensor, such as an electronic still camera.

2. Description of the Background Art

Conventionally, in an automatic focusing camera having an automatic focusing function such as a video camera and an electronic still camera, a focus controlling approach utilizing a video signal itself obtained from an image sensor for evaluating the state where the focus is controlled has been employed. According to such an approach, many good characteristics can be obtained. For example, there exists essentially no parallax. In addition, even if the depth of field is small and an object is located in the distance, the focus can be exactly matched. Furthermore, according to this approach, a specific sensor for automatic focusing need not be separately provided, so that the apparatus is very simple as a mechanism.

As an example of such a focus control method utilizing a video signal, a so-called hill-climbing servo system has been conventionally known. This hill-climbing servo system is described in, for example, U.S. Pat. No. 4,638,364 and U.S. Pat. No. 4,614,975, Japanese Patent Laying-Open No. 58-58505 and No. 60-103776. Briefly stated, a high frequency component of a video signal obtained from an image sensor is detected every one field as a focus evaluating value, and a focusing lens is moved back and forth in the direction of the optical axis so that the focus evaluating value always takes the maximal value.

Figure 1:
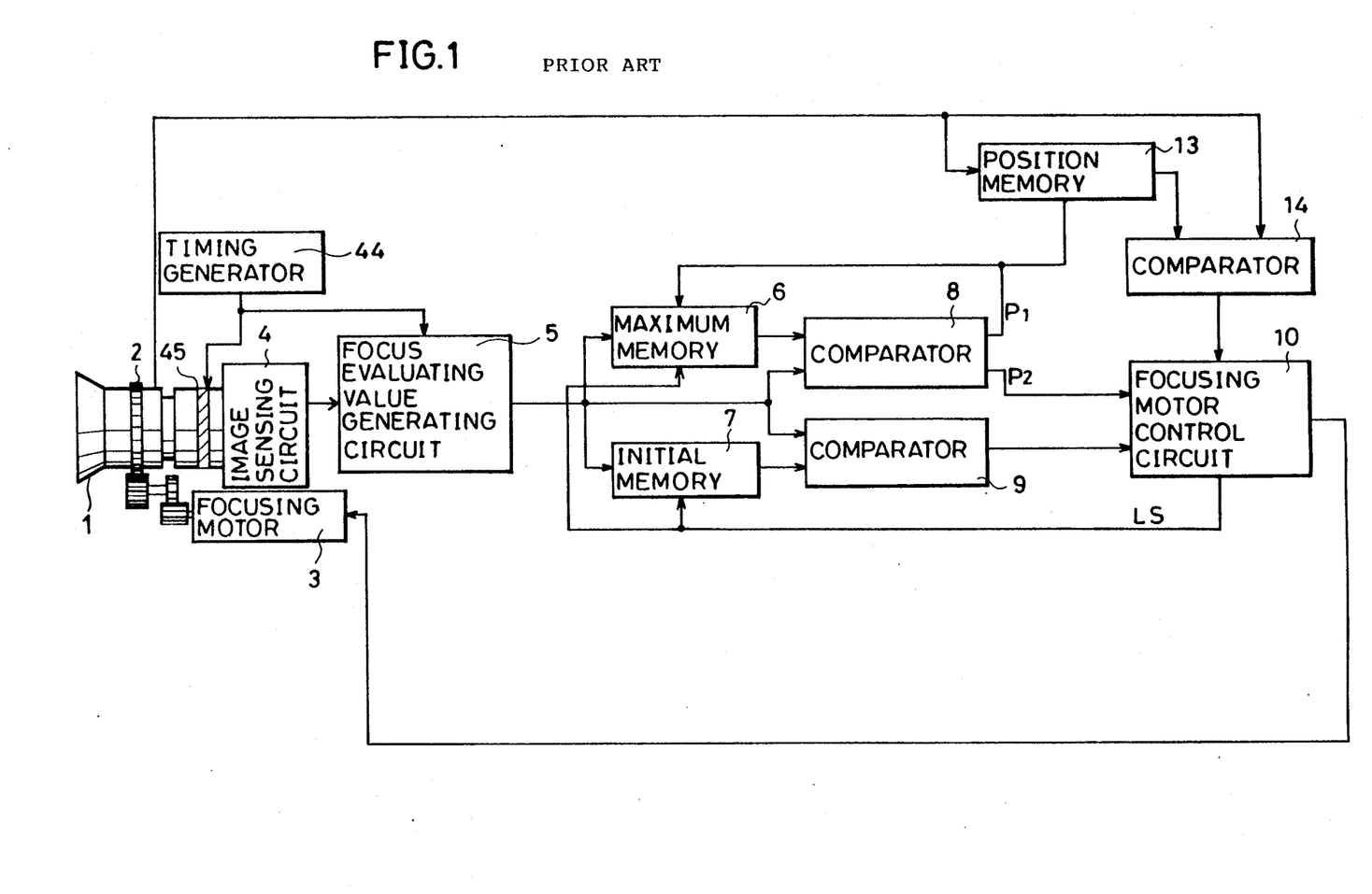
FIG. 1 is a schematic block diagram showing an automatic focusing system in a conventional automatic focusing camera.
Figure 2:
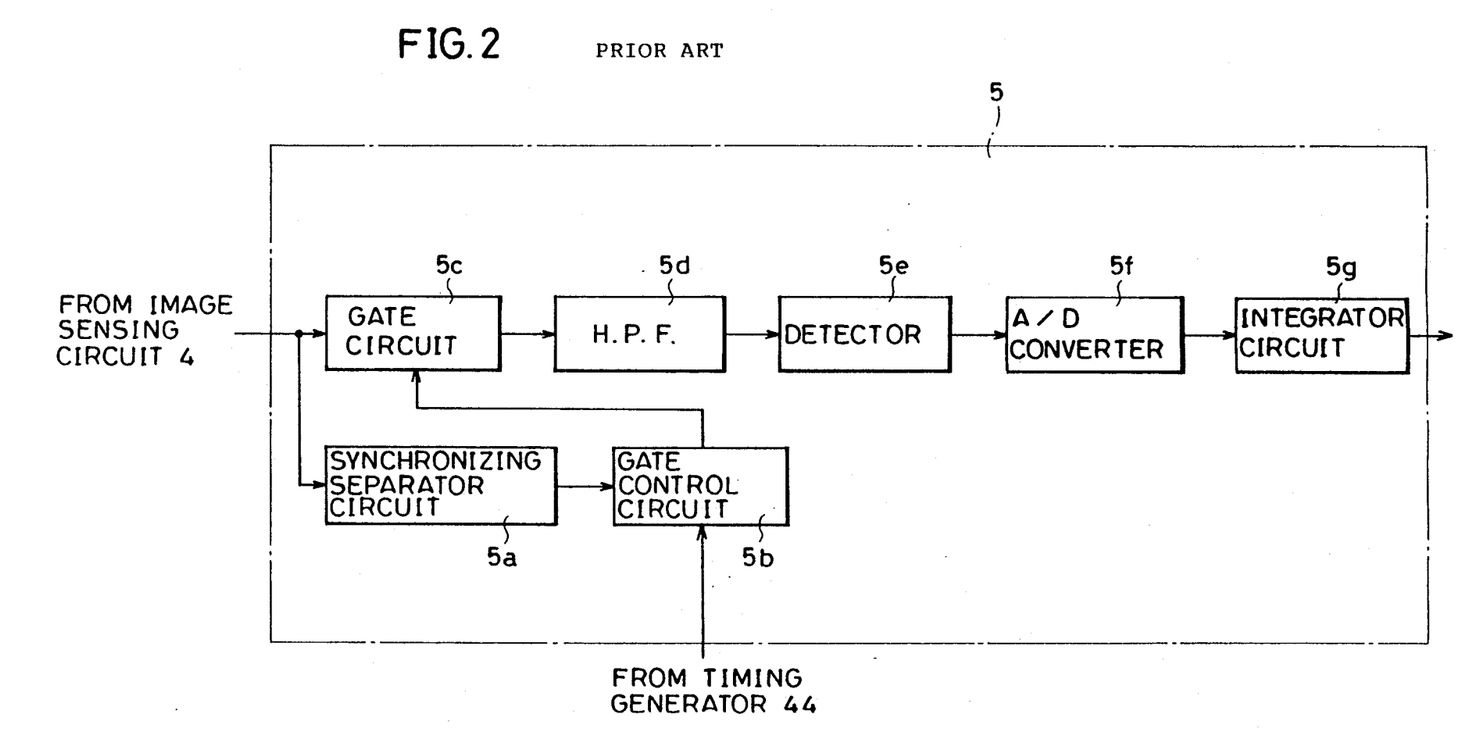
FIG. 2 is a block diagram showing the details of the focus evaluating value generating circuit indicated in FIG. 1.

FIG. 1 is a schematic block diagram showing an automatic focusing apparatus in an automatic focusing camera utilizing such a hill-climbing servo system, and FIG. 2 is a block diagram showing the details of a focus evaluating value generating circuit shown in FIG. 1. Such a conventional automatic focusing apparatus is disclosed in, for example, Japanese Patent Laying-Open No. 63-125910.

In FIG. 1, an automatic focusing camera comprises a focusing ring 2 for moving a focusing lens 1 back and forth in the direction of the optical axis, a focusing motor 3 for driving the focusing ring 2, a solid state image sensing device 45 such as a CCD (Charge Coupled Device), an image sensing circuit 4, and a timing generator 44. The focusing lens 1 may be moved using a piezoelectric device instead of a motor. In addition, the solid state image sensing device 45 such as a CCD itself may be moved back and forth instead of the focusing lens so as to change the relative position of the focusing lens 1 relative to the solid state image sensing device 45.

Figure 3:
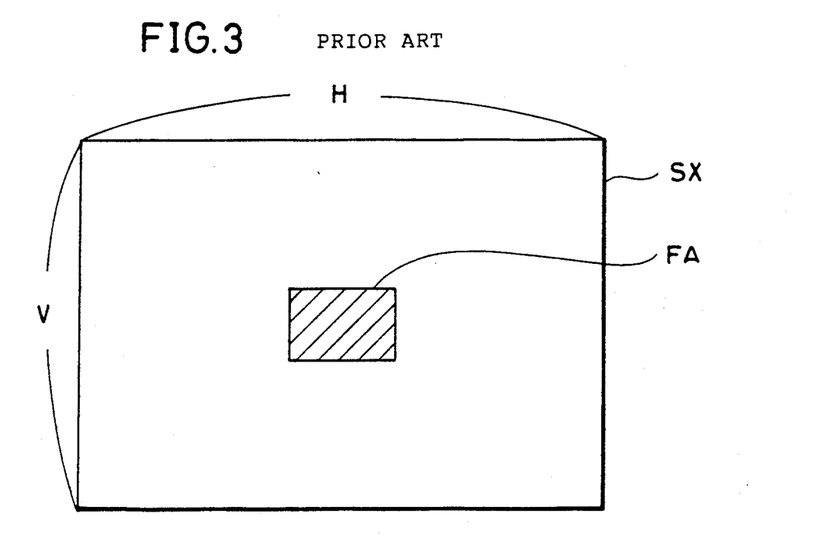
FIG. 3 is a schematic diagram showing the focusing area prescribed on the image picture.

After an image formed on the surface of the CCD 45 by the focusing lens 1 is photoelectric-converted to an electric signal by the CCD 45, the signal is converted to a video signal by the image sensing circuit 4 and input to the focus evaluating value generating circuit 5. With reference to FIG. 2 indicating the details of the focus evaluating value generating circuit 5, a luminance signal component in a video signal output from the image sensing circuit 4 is applied to a synchronizing separator circuit 5a and a gate circuit 5c. The synchronizing separator circuit 5a separates a vertical synchronizing signal VD and a horizontal synchronizing signal HD from the input luminance signal and applies the separated signals VD and HD to a gate control circuit 5b. The gate control circuit 5b sets a rectangular sampling area FA as a focusing area in the central portion of a picture SX as indicated in FIG. 3, in response to the input vertical synchronizing signal VD and horizontal synchronizing signal HD and an output pulse from the timing generator 44 (FIG. 1) driving the CCD 45. The gate control circuit 5b applies a signal for opening or closing a gate for every field to the gate circuit 5c so that the luminance signal is allowed to pass only within the range of the sampling area.

Only the luminance signal corresponding to the range of the sampling area is applied to a high-pass filter 5d for every field by the gate circuit 5c. The high frequency component of the video signal separated by this high-pass filter 5d is amplitude-detected by a detector 5e, the detected output being applied to an A/D converter circuit 5f. The high frequency component converted into a digital value in a prescribed sampling cycle by the A/D converter circuit 5f (A/D converted data) is sequentially applied to an integrator circuit 5g.

The integrator circuit 5g is practically a so-called digital integrator composed of an adder (not shown) to add the input A/D converted data and the latch data of the succeeding latch circuit, and the latch circuit (not shown) to latch the output of the adder and to be reset for every field, and the data of the latch circuit immediately before it is reset, i.e. the sum of A/D converted data for the period of one field is output as a focus evaluating value. That is, the focus evaluating value generating circuit 5 extracts a luminance signal in the focus area in time dividing manner, then digitally integrates the high frequency component thereof over 1 field period and outputs the resulting integrated value as the focus evaluating value of the present field.

Immediately after the automatic focus operation is initiated, the focus evaluating value for the first one field output from the focus evaluating value generating circuit 5 is first applied to a maximum value memory 6 and an initial value memory 7 and held therein. Subsequently, a focusing motor control circuit 10 makes the focusing motor 3 rotate in the prescribed direction. Then a comparator 9 compares the initial focus evaluating value held in the initial value memory 7 and the focus evaluating value output from the focus evaluating value generating circuit 5 to generate a comparison signal, and the focusing motor control circuit 10 responds to this signal and carries out the initialization of the rotating direction of the focusing motor 3.

That is, the focusing motor control circuit 10 continues to make the focusing motor 3 rotate in the above mentioned prescribed direction, until the comparator 9 generates a comparison output indicating "large" or "small". If the comparator 9 outputs a compared output indicating that the later obtained focus evaluating value is larger exceeding the prescribed fluctuation range compared to the initial focus evaluating value held in the initial value memory 7, the focusing motor control circuit 10 maintains the above mentioned prescribed rotating direction as it is. Meanwhile, if an comparison output is obtained indicating that the later obtained focus evaluating value is smaller exceeding the prescribed fluctuation range compared to the initial focus evaluating value, the focusing motor control circuit 10 reverses the rotating direction of the focus motor 3.

Thus, the initialization of the rotating direction of the focussing motor 3 is completed, the focusing motor control circuit 10 monitors the output of a comparator 8 from this time on.

Meanwhile, the comparator 8 compares the maximum focus evaluating value so far held in the maximum memory 6 and the current focus evaluating value output from the focus evaluating value generating circuit 5 and outputs two kinds of comparison signals (P1, P2), i.e. in the case in which the current focus evaluating value is larger than the focus evaluating value held in the maximum memory 6 (the first mode), or the case in which the same is reduced exceeding the prescribed threshold value $\Delta y$ (the second mode). Now, in case the current focus evaluating value is larger than the content of the maximum value memory 6, the content of the maximum value memory 6 is updated in response to the output of the comparator 8 (P1) whereby the maximum value of the focus evaluating value so far is always held in the maximum value memory 6.

In response to the position of the focusing ring 2 supporting the focusing lens 1, a focus ring position signal is generated from the focusing ring 2 and this focusing ring position signal is applied to a focusing ring position memory 13. This focusing ring position memory 13 is updated in response to the output of the comparator 8 so as to always hold the focusing ring position signal at the time when the focus evaluating value reaches the maximum. The focusing ring position signal is generally output from a potentiometer (not shown) provided to detect the focus ring position. However, it is also possible to utilize a stepping motor as the focusing motor 3 and to detect the amount of rotation of this motor in the near point direction and the infinity point direction as positive and negative stepping amount respectively thereby indicating the focusing ring position or focusing motor position by this stepping amount.

Figure 4:
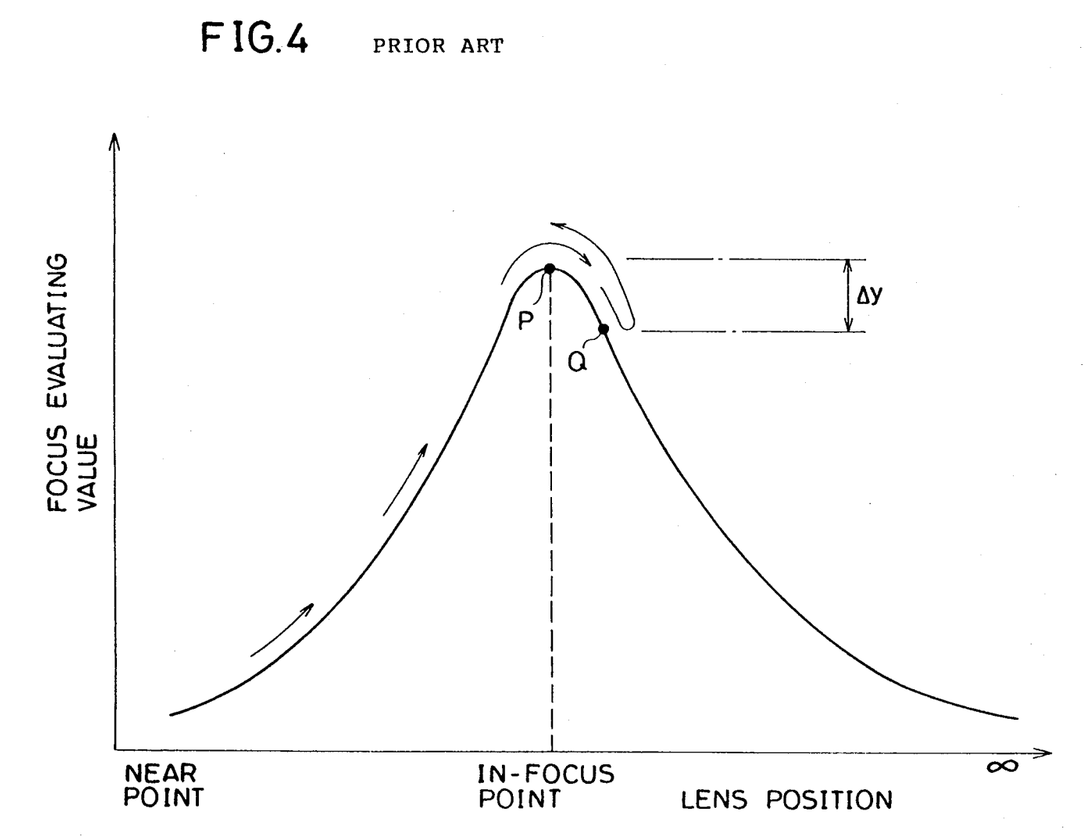
FIG. 4 is a graph indicating the focusing operation in accordance with a hill-climbing servo system.

The focusing motor control circuit 10 monitors the output of the comparator 8 while rotating the focusing motor 3 in the direction initialized in response to the output of the comparator 9 as described above. With reference to FIG. 4 indicating the relation between the positions of the lens and the focus evaluating value, when the comparison output (P2) of the second mode indicating the current focus evaluating value is reduced exceeding the above mentioned threshold value $\Delta y$ compared to the maximum focus evaluating value, the focusing motor control circuit 10 reverses the rotating direction of the focusing motor 3. The focusing motor is first reversed when the focus evaluating value is reduced exceeding the prescribed threshold value for the purpose of preventing the erroneous operation caused by the noise of the focus evaluating value.

After the focusing motor 3 is reversed, comparison is conducted in a comparator 14 between the content of the focusing ring position memory 13 which corresponds to the maximum value of the focus evaluating values and the current focusing ring position signal generated from the focusing ring 2. When a matching is obtained, i.e. when the focusing ring 2 is returned to the position in which the focus evaluating value reaches its maximum, the focusing motor control circuit 10 stops the rotation of the focusing motor 3. At the same time, the focusing motor control circuit 10 outputs a lens stop signal LS. A series of automatic focusing operation is thus completed.

Figure 5:
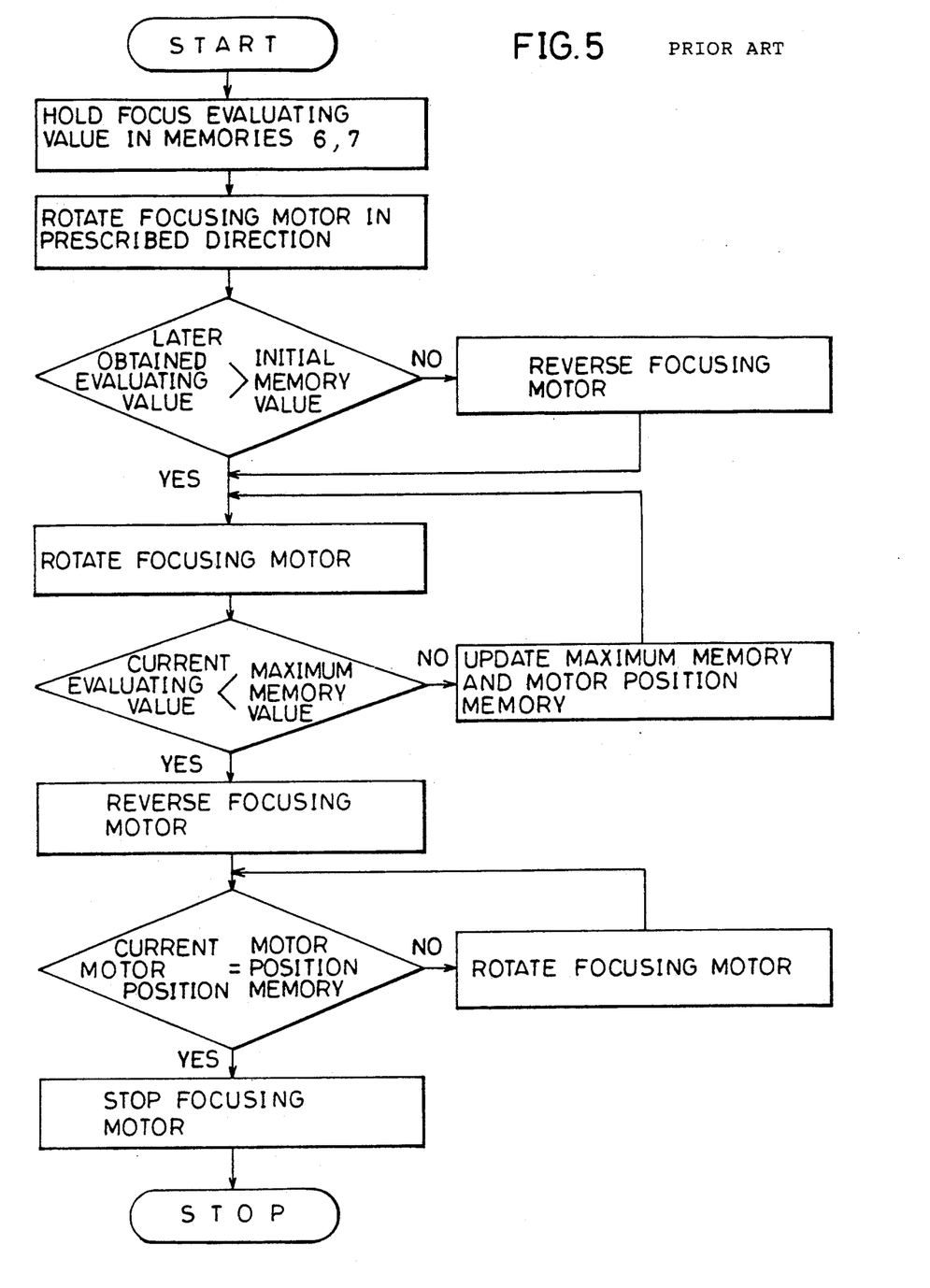
FIG. 5 is a flow chart showing the focusing operation in accordance with a conventional hill-climbing servo system.

FIG. 5 is a flow chart showing a case in which the above mentioned series of automatic focusing operation is carried out in a software manner utilizing a microcomputer. Since the detail is just as mentioned above, therefore the description is not repeated here.

Figure 6:
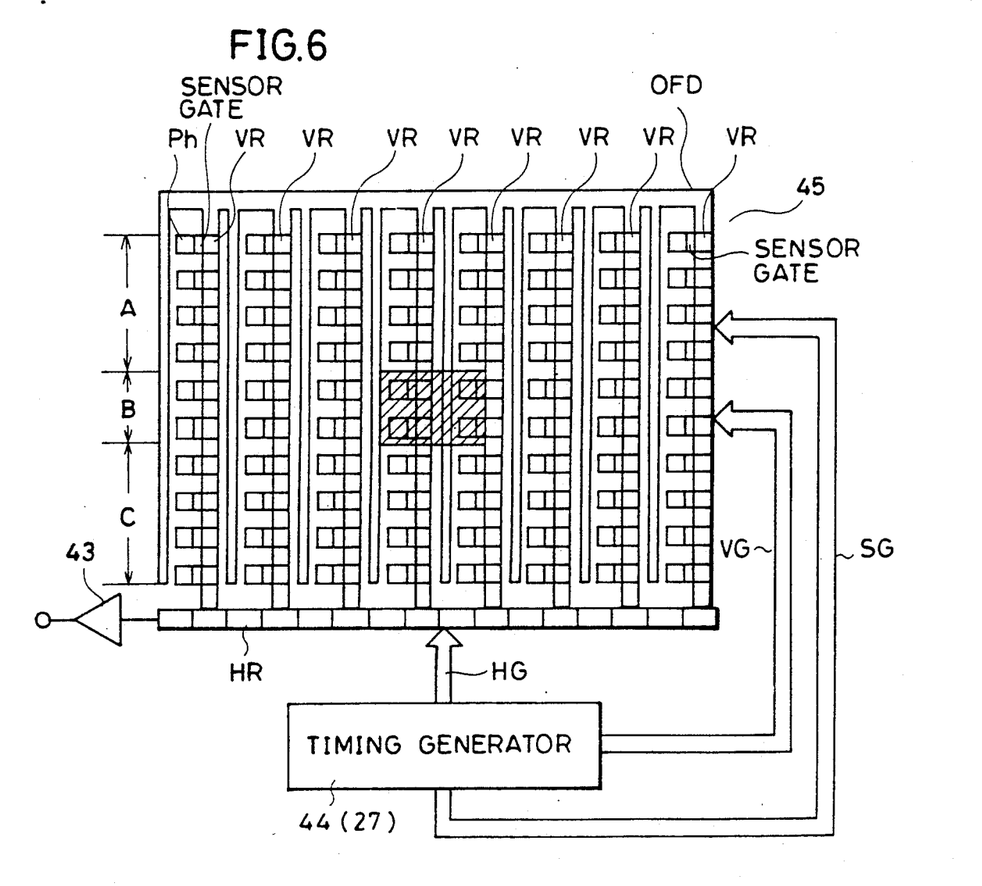
FIG. 6 is a schematic diagram showing a structure of a CCD.

A video camera is a typical example of a camera which needs to be always supplied with a video signal successively as mentioned above, and particularly in a video camera employing the automatic focusing function of a hill-climbing servo system, the automatic focusing operation is carried out utilizing the above mentioned successively supplied video signal as a material for judgement. A description will be given in the following on the operating method of the CCD 45 by the timing generator 44. FIG. 6 is a schematic diagram indicating a general structure of the CCD 45. As CCDs, the one employing a known interline system and the other one employing a known frame transfer system are representative, and the description in the following is related to a CCD employing the interline system which is often used for video cameras.

In FIG. 6, the CCD 45 is provided with an array composed of a plurality of photosensors Ph arranged in the two-dimension of the vertical direction (column direction) and the horizontal direction (the row direction). Here, in the CCD of FIG. 6, for the purpose of description, the array is described having a structure that each row is formed of 8 photosensors Ph and each column is formed of 10 photosensors Ph, but in a CCD used for an actual video camera, a large number of photosensors, for example 510 in each row, and 480 in each column, are formed.

Corresponding to each photosensor Ph, a register VR is formed and the photosensor Ph and the register VR are coupled by a sensor gate. The output electric charges caused by the photoelectric conversion operation by each photosensor Ph are extracted through the sensor gate to the corresponding register VR. The registers VR in each column are coupled in the vertical direction to form a vertical transfer portion, which sequentially transfers the electric charges extracted from respective photosensors Ph in the vertical direction. And then the charges transferred to the register located in the lowest end of the vertical transfer portion in each column are extracted to a register HR which corresponds to each column. These registers HR are coupled in the horizontal direction to form a horizontal transfer portion, which supplies the output charges in respective rows to an output portion 43.

Figure 7:
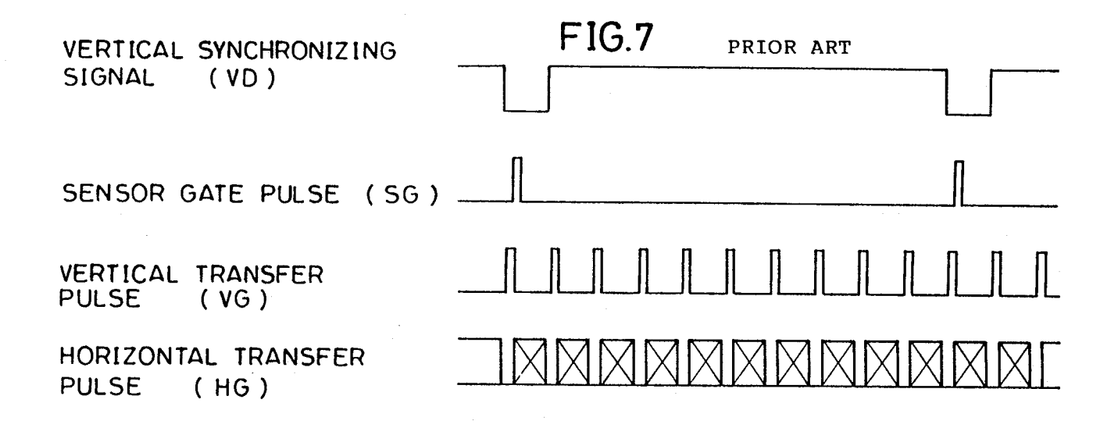
FIG. 7 is a timing chart showing how a conventional CCD is driven.

The timing generator 44 generates sensor gate pulses SG, vertical transfer pulses VG and horizontal transfer pulses HG, and these are used for the extraction of charges from the photosensors Ph, the transfer control of charges in the vertical transfer portion and the transfer control of charges in the horizontal transfer portion, respectively. FIG. 7 is a waveform diagram showing the charge transfer operation of the CCD using these various signals.

First, a sensor gate pulse SG is generated from the timing generator 44 in synchronization with a vertical synchronizing signal VD, i.e. once every one field (1/60 seconds), and the same is supplied to all the sensor gates constituting the array of FIG. 6 simultaneously and commonly whereby the signal charges of the photosensors are simultaneously transferred to the corresponding registers VR respectively.

Next, when a vertical transfer pulse VG is generated from the timing generator 44 for every one horizontal scanning period (1H), the signal charges held in respective registers VR constituting the vertical transfer portion are transferred by one row for every 1H in the vertical direction (downward direction), and transferred from the lower end of each vertical transfer portion to the register HR of the horizontal transfer portion on a row basis. Here, the vertical transfer pulses VG includes 10 pulses for every one field period, and this is because each column includes 10 photosensors Ph in the CCD of FIG. 6. That is, all the signal charges read out simultaneously from the photosensors PH to the registers VR by sensor gate pulses are to be transferred to the horizontal transfer portion over the period of one field.

Meanwhile, the charges of each row transferred to the horizontal transfer portion from the lower ends of the vertical transfer portions are sequentially transferred to the output portion 43 for every 1H, in response to the horizontal transfer pulse HG from the timing generator 44.

In the above described manner, in response to respective pulses output from the timing generator 44, signal charges for every row are sequentially extracted from the CCD 45 to the output portion 43, and after being amplified at the output portion 43, the charges are applied to the signal processing portion (not shown) in the image sensing circuit (FIG. 1) in the successive stage. The signal processing portion carries out the prescribed signal processing on these signal charges and outputs a video signal.

Here, the above mentioned operating method of the CCD is presented schematically for the purpose of easily describing the basic operating principle, and therefore in practice the vertical transfer portion is structured such that signals for two rows are added to each other and then transferred to the horizontal transfer portion, in order to realize interlace operation.

As mentioned above, the general operating method of a CCD requires one field period for reading out the signal charges from all of the photosensors constituting the CCD, and therefore a focus evaluating value to be used for the automatic focusing operation is available only once for every one field.

On the other hand, in order to carry out the above mentioned automatic focusing operation in accordance with a hill-climbing servo system at high speed, it is inevitable to increase the rotating speed of the focusing motor 3 (FIG. 1). Now, in case the rotating speed of the focusing motor 3 is simply increased, the amount of movement of lens during one field period is increased accordingly, but since the calculation of a focus evaluating value is always carried out only once for every one field period, the frequency of detection of the focus evaluating value with respect to the amount of movement of the lens decreases. Therefore, the automatic focusing control becomes rough thereby decreasing the accuracy of focusing remarkably. Consequently, there emerges a certain limit to the high speed driving of the focus motor.

Described further in detail, for example, in case a lens of F2. 8 is used at a focal distance of 30 mm for a solid state image sensing device of ⅔ inches, at least about 2 seconds are necessary to shift the focusing ring over the entire range possible to be focused by the lens, i.e. the range between the position close to the camera and the position at infinity, in order to maintain the high accuracy in the automatic focusing operation in accordance with the above mentioned hill-climbing servo system. This is because the focus evaluating value needs to be detected at least 120 times usually in order to carry out the focusing operation with the necessary accuracy in such a range, and also as described in the foregoing, one field period i.e. 1/60 seconds is necessary for one detection.

Usually in a video camera, as the image sensing is successively performed, it is not very much troublesome in practice to spend a little bit of time for focusing. However, in case such an automatic focusing function is applied to an electronic still camera in which image sensing the state is not continued, the fact that at least about 2 seconds are necessary for focusing becomes a big problem in practice. That is, generally in a still camera if the time between pressing the releasing button (the shutter button) and the completion of image sensing is not as short as about 0.5 seconds, the user recognizes the releasing time lag and the camera will be very difficult to handle for him. Here, if it is assumed that, of the above mentioned 0.5 seconds, about 0.4 seconds is needed for a focusing operation, it is necessary to restrain the time to 1/5 of two seconds which is usually necessary for focusing. However, as described in the foregoing, for the frequency of the calculation of focus evaluating values is constant, such significant reduction of focusing time is difficult to realize in accordance with the conventional technology. Therefore, considering the focusing time, the conventional automatic focusing system in which the focus evaluating value is detected only once every one field period can not be employed for use in an electronic still camera.

SUMMARY OF THE INVENTION

Therefore, one object of this invention is to realize an automatic focusing operation at remarkably increased speed in an automatic focusing camera employing a hill-climbing servo system, without deteriorating the accuracy of the operation.

Another object of this invention is to realize an automatic focusing function using the hill-climbing servo system for achieving the in-focus state within a shorter time period also in the type of camera in which the image sensing state is not continued, such as an electronic still-camera.

This invention, briefly, is in an automatic focusing camera with a solid state image sensing device in which signal charges from photosensors are read out over a plurality of times within one field period, every time these are read out, charges from photosensors in the regions above and below the region formed of rows of photosensors including the focusing area are swept out at high speed in the upward direction and downward direction respectively as ineffective charges, and then the signal charges of rows including the focusing area are extracted to the horizontal transfer portion in a usual timing.

Therefore, the main advantage of this invention is to realize a high-accuracy in-focus state for a short period of time when an automatic focusing system in accordance with a hill-climbing servo system which uses a video signal as a material for judgement on in-focus state is employed even for a type of camera such as an electronic still camera in which the image sensing state is not continued.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 8:
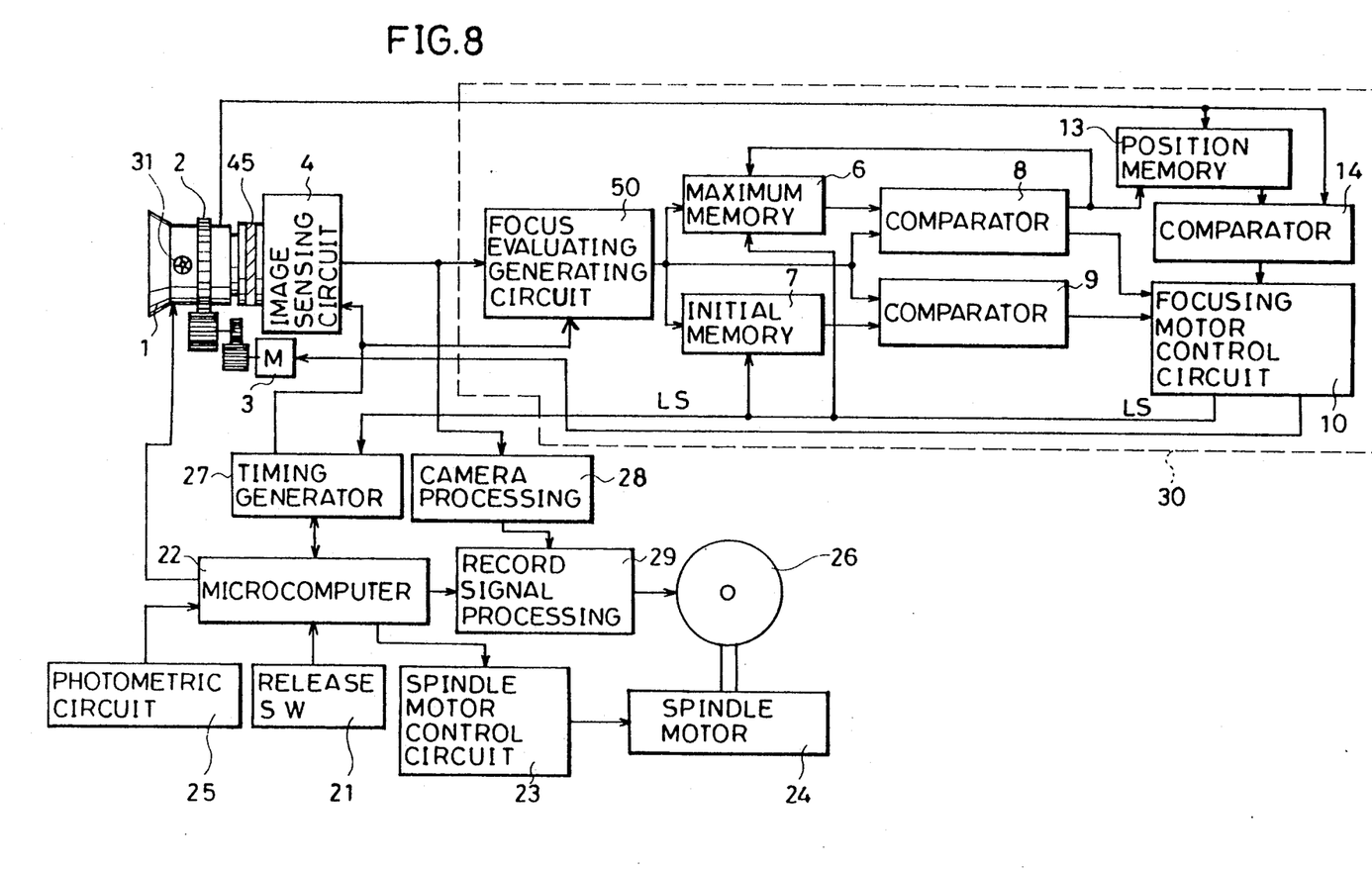
FIG. 8 is a schematic block diagram showing an electronic still camera in accordance with one embodiment of the present invention.

FIG. 8 is a schematic block diagram showing an electronic still camera provided with automatic focusing function by a hill-climbing servo system in accordance with one embodiment of this invention. Here, the structural elements common with those in the foregoing FIG. 1 and FIG. 2 are represented by the identical numerals and symbols, and therefore, the description thereof is omitted.

With the reference to FIG. 8, when a user operates a releasing switch 21 in photographing, a microcomputer 22 turns on the power supplies in all of the circuits. When the power supplies are in this on-state, a spindle motor control circuit 23 drives a spindle motor 24 and executes the control of the spindle servo so as to rotate the spindle motor 24 at a certain rotating speed (for example, 3600 R.P.M.). A video floppy 26 is driven to rotate by this spindle motor 24.

At the same time, a photometric circuit 25 including a photodiode (not shown) initiates a photometric operation for adjusting the quantity of light. The microcomputer 22 stores the values of suitable diaphragm and shuttering speed corresponding to various photometric values in advance. Accordingly, the microcomputer 22 determines on one to one basis the values of suitable diaphragm and shuttering speed based on the actual photometric values determined at the photometric circuit 25. A mechanical diaphragm mechanism 31 is responsive to a signal from the microcomputer 22 to carry out the exposure control with respect to the incident light, so as to maintain the value of diaphragm determined by the microcomputer 22.

As a suitable exposure state is thus assured, the microcomputer 22 makes the automatic focusing circuit 30 carry out an automatic focusing operation thereby moving lens 1 to the in-focus position. In this focusing operation, the timing generator 27 drives the CCD 45 by a first driving method which will be described in detail in the following.

After this focusing operation is completed, the timing generator 27 drives the CCD 45 in accordance with a second driving method which corresponds to the driving method of the conventional technology described in connection with FIGS. 6 and 7. That is, in accordance with the second driving method, the signal charges of all of the photosensors Ph are sequentially extracted from the CCD 45 at a certain constant speed over one field period (1/60 seconds), and applied to the image sensing circuit 4. A video signal thus obtained from the image sensing circuit 4 after the focusing operation is completed, undergoes processing necessary for a video signal such as gamma correction by a camera processing circuit 28 and then applied to a record signal processing circuit 29. The video signal subjected to signal processing such as FM modulation etc. at the record signal processing circuit 29, is recorded in the video floppy 26 and then the microcomputer 22 turns off the power supply of each circuit. A series of recording (image sensing) operation is thus completed.

Figure 9:
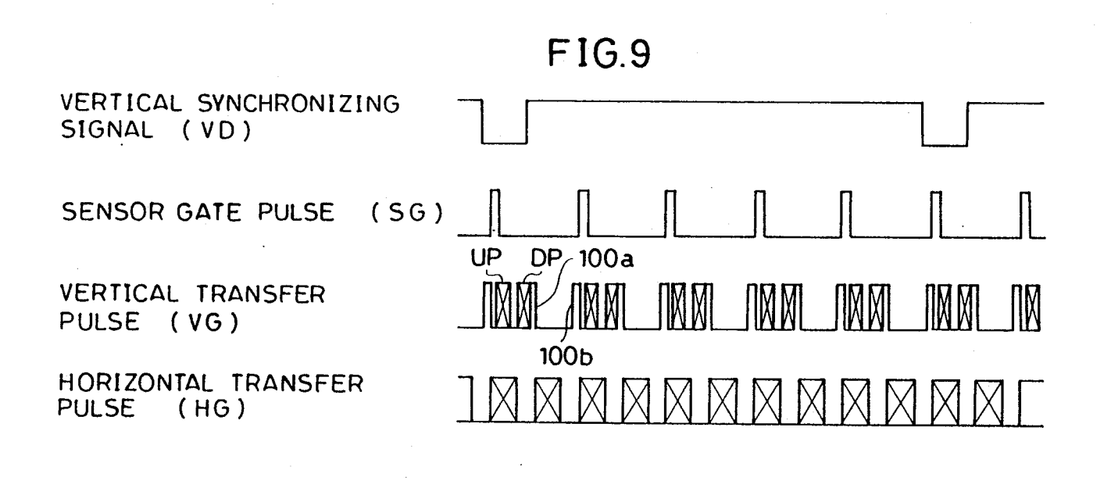
FIG. 9 is a timing chart showing how the CCD employed for the electronic still camera in FIG. 8 is driven.

Next, a detailed description on the first driving method of the CCD 45 carried out during the focusing operation will be given in the following. In this first driving method, unlike the above mentioned second driving method in which a focus evaluating value is detected only once for every one field, the generator 27 drives the CCD 45 so as to obtain a plurality of focus evaluating values during one field period (1/60 seconds). FIG. 9 is a timing chart showing how the CCD 45 is driven by the time generator 27.

First, in the present embodiment, as indicated in FIG. 3, the focusing area (FA) is set as a rectangular area (the dimension (1/5) V×(¼) H) in the central portion of the entire picture (the dimension V×H). This focusing area (FA) corresponds to the region indicated by inclined lines in the central portion of the CCD 45 in FIG. 6. Accordingly, rows of photosensors necessary for the detection of the focus evaluating value corresponds to a region B (2 rows) with (1/5) V in width located in the center of the CCD 45 and the signal charges from photosensors Ph in a region A of (2/5) V in width thereabove and a region C of (2/5) V in width therebelow are not necessary for the detection of the focus evaluating value. Since the width of the region necessary for the detection of the focus evaluating value on a picture is (1/5) V with respect to the vertical direction of the picture, five sensor gate pulses SG are generated during one field period by equally dividing one field period into five, in accordance with the first driving method, unlike the second driving method indicated in FIG. 7 in which one sensor gate pulse SG is generated for every one field. As a result, signal charges are extracted once every 1/300 seconds from respective photosensors Ph to the vertical transfer portions.

Next, vertical transfer pulses VG are applied to the CCD 45 from the timing generator 27, and the transfer of the signal charges read out to the vertical transfer portions is conducted in the vertical direction but as described in the foregoing, the signal charges from the photosensors in the regions A and C in FIG. 6 are not necessary for the detection of the focus evaluating values. Then, before generation of a usual vertical transfer pulse 100a, first, an upward sweep-out pulse UP is applied to the vertical transfer portions from the timing generator 27 whereby the signal charges of the entire region are transferred at high speed in the upward direction in FIG. 6 by a distance (2/5) V, and all of the signal charges in the region A are swept out as ineffective charges to an overflow drain OFD.

Next, a downward sweep-out pulse DP is applied to the vertical transfer portions from the timing generator 27 whereby all of the signal charges from the regions B and C transferred by the above mentioned upward sweep-out pulse UP by the distance (2/5) V upward, not sweep out and remaining in the vertical transfer portions, are transferred downward at high speed by a distance of (4/5) V. As a result, all of the signal charges in the region C are swept out to the horizontal transfer portion. Accordingly, the signal charges from the region B are to remain in the lower ends of respective vertical transfer portions.

During the vertical upward and downward transfer of the signal charges by the above mentioned pulses UP and DP, in the horizontal transfer portion the held charges continue to be transferred to the output portion 43 for every 1H by horizontal transfer pulses HG from the timing generator 27 as usual, while the charges output during this period are the charges swept out from the vertical transfer portions as ineffective charges and therefore the signals produced based on these charges by the image sensing circuit 4 in the subsequent stage are meaningless as video signals.

As described in the foregoing, after the signal charges obtained in the photosensors in the regions A and C are all swept out as ineffective charges by the sweep-out pulses UP and DP, the signal charges from the photosensors of two rows in the region including the focusing area, are sequentially transferred to the horizontal transfer portion by one row for every 1 H by the usual vertical transfer pulses 100a and 100b. In the horizontal transfer portion, thus transferred signal charges are output to the output portion 43 over 1H period by a horizontal transfer pulse HG. A video signal produced by the image sensing circuit 4 based on the charges thus obtained from the output portion 43 is supplied to a focus evaluating value generating circuit 50 in the subsequent stage as a regular video signal related to the region B.

Here, the focus evaluating value generating circuit 50 has approximately the same structure as the focus evaluating value generating circuit 5 indicated in FIG. 2. The focus evaluating value generating circuit 50 in FIG. 8 is different from the focus evaluating value generating circuit 5 in that FIG. 2 in that a circuit (not shown) corresponding to the gate control circuit 5b in FIG. 2 is responsive to an output from the timing generator 27 to generate gate control signals so as to extract a luminance signal only in the focus area FA out of the luminance signals in video signals corresponding to the signal charges of two rows in the region B, during the period after a vertical transfer pulse 100a is generated before the next sensor gate pulse SG is generated.

According to the first driving method as indicated above, since five focusing evaluating values are obtained for every one field period, i.e. once every 1/300 seconds, it is possible to realize an automatic focusing operation with the same accuracy even when the rotating speed of the focus motor 3 during focusing operation is increased to five times as fast as the conventional.

After the high accuracy automatic focusing operation is completed by driving the CCD by the first driving method, a lens stop signal LS is supplied to the timing generator 27 by the focusing motor control circuit 10 and then the driving of the CCD is immediately initiated in accordance with the conventional second driving method. Then, a regular video signal obtained immediately after that, undergoes various signal processings and is recorded in the video floppy 26.

In the above mentioned embodiment, an interline type CCD is used as the solid state image sensing device for the electronic still camera. The same effect may be obtained in case a well known frame transfer type CCD is used, which shifts all of the signal charges generated in the array of the photosensors to the storage portion in parallel and then transfer them to the horizontal register. It goes without saying that this invention is applicable to various CCDs such as an MOS type and the like.

Also in the above mentioned embodiment, the description was given on a case in which a signal which reaches the maximum value at the in-focus position is used as a focus evaluating value, but the same effect may be obtained when the circuit is provided to detect the minimum value utilizing a signal which reaches its minimum value at the in-focus position as a focus evaluating value and the control to maintain the minimum value of the detected values is carried out.

As in the foregoing, in accordance with the embodiments of this invention, also when an automatic focusing system in accordance with a hill-climbing servo system utilizing a video signal is employed for use in an electronic still camera, it is possible to realize the high accuracy in-focus state over a short period of time.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An automatic focusing camera with an automatic focusing function for automatically matching the focus with respect to an object, comprising:
   a focusing lens (1) having an optical axis,
   a solid state image sensing device (45) for converting incident light from said object through said focusing lens into signal charges, said solid state image sensing device comprising:
   a plurality of photoelectric converting devices (Ph) arranged as rows and columns in two dimensional horizontal and vertical directions, respectively,
   a plurality of vertical transfer means (VR) for transferring signal charges output from said plurality of photoelectric converting devices by respective ones of the columns in the vertical directions, and
   horizontal transfer means (HR) for transferring the signal charges output from said plurality of vertical transfer means in the horizontal direction,
   relative position changing means (2,3) for changing a relative position, in a direction of the optical axis of said focusing lens, relative to said solid state image sensing device,
   an image sensing circuit (4) for producing a video signal based on the signal charges output from said horizontal transfer means of said solid state image sensing device and supplying the signal,
   timing generating means (27) for generating and supplying to said solid state image sensing device, during automatic matching of the focus, control signals for driving said solid state image sensing device so as to read signal charges from said plurality of photoelectric converting devices a plurality of times for every vertical period of said video signal, sweep out at high speed the signal charges read out from the photoelectric converting devices in a region other than ones of the rows corresponding to a focusing area set in an image picture as ineffective charges through said vertical transfer means before the next reading out, and output the signal charges read out from the photoelectric converting devices of the rows corresponding to said focusing area to said horizontal transfer means as regular signal charges through said vertical transfer means before the next reading out, focus evaluating value detecting means (50) for detecting a level of high frequency component of the video signal corresponding to the region in said focusing area out of the produced video signal, every time the video signal is produced by said image sensing circuit based on the regular signal charges output to said horizontal transfer means, converting the level into a focus evaluating value an absolute value of which attains a maximum value at an in-focus position, and sequentially supplying the focus evaluating value, and control means (6, 7, 8, 10, 13, 14) responsive to said supplied focus evaluating value for driving said relative position changing means so as to move the relative position of said focusing lens to the position where the absolute value of said focus evaluating value attains its maximum value.

2. An automatic focusing camera according to claim 1, wherein
said solid state image sensing device includes a plurality of sensor gate means for reading out signal charges from said plurality of photoelectric converting devices to said vertical transfer means,
said each vertical transfer means comprising connecting registers (VR) for holding the signal charges read out from said plurality of photoelectric converting devices in the vertical direction,
said horizontal transfer means comprising connecting registers (HR) for holding the signal charges output from said plurality of vertical transfer means in the horizontal direction, and
said timing generating means (27) generates,
a sensor gate pulse (SG) for simultaneously opening said plurality of sensor gate means,
a vertical transfer pulse (VG) for driving said vertical transfer means, and
a horizontal transfer pulse (HG) for driving said horizontal transfer means.

3. An automatic focusing camera according to claim 2, wherein
said timing generating means (27) generates, at a time of the automatic matching of said focus, said sensor gate pulse (SG) over said plurality of times for one vertical period, vertical transfer pulses (VG) formed of first pulses (UP, DP) for sweeping out said ineffective charges in both upward and downward directions and second pulses (100a, 100b) for transferring said regular signal charges to said horizontal transfer means, every time one said sensor gate pulse is generated, and said horizontal transfer pulse (HG) for transferring charges from said horizontal transfer means as output signals every one horizontal period, and
said timing generating means generates, after the completion of the automatic matching of said focus, one said sensor gate pulse (SG) during one vertical period, and one said vertical transfer pulse (VG) and one said horizontal transfer pulse (HG) for every one horizontal period.

4. An automatic focusing camera according to claim 1, wherein
said solid state image sensing device further comprises an overflow drain for receiving said swept out ineffective charges.

5. An automatic focusing camera according to claim 1, further comprising;
means (21) for instructing execution of an image sensing operation and,
driving means (22) responsive to said instructing means for initiating said timing generating means (27).

6. An automatic focusing camera according to claim 1, further comprising;
means (23, 24, 26, 28, 29) for recording video signals obtained from said image sensing circuit, after the completion of said automatic matching of the focus.

7. An automatic focusing camera according to claim 1, wherein
said solid state image sensing device comprises an interline type CCD.

8. An automatic focusing camera according to claim 1, wherein
said solid state image sensing device comprises a frame transfer type CCD.

9. An automatic focusing camera according to claim 1, wherein
said relative position changing means comprises
a focusing ring (2) and a focusing motor (3) for moving said focusing lens back and forth in the direction of the optical axis.

10. An automatic focusing camera with an automatic focusing function for automatically matching the focus with respect to an object, comprising:
a focusing lens (1) having an optical axis,
a solid state image sensing device (45) for converting incident light from said object through said focusing lens into signal charges, said solid state image sensing device comprising a plurality of photoelectric converting devices (Ph) arranged as rows and columns in two-dimensional horizontal and vertical directions, respectively,
relative position changing means (2, 3) for changing a relative position, in a direction of the optical axis, of said focusing lens relative to said solid state image sensing device,
an image sensing circuit (4) for producing a video signal based on the signal charges output from said solid state image sensing device and supplying the signal,
timing generating means (27) for generating and supplying to said solid state image sensing device, during automatic matching of the focus, control signals for driving said solid state image sensing device so as to read signal charges from said plurality of photoelectric converting devices a plurality of times for every vertical period of said video signal, sweep out at high speed the signal charges read out from the photoelectric converting devices in a region other than ones of the rows corresponding to a focusing area set in an image picture as ineffective charges before the next reading out, and output the signal charges read out from the photoelectric converting devices of the rows corresponding to said focusing area as regular signal charges before the next reading out, focusing evaluating value detecting means (50) for detecting a level of a high frequency component of the video signal corresponding to the region in said focusing area out of the produced video signal, every time the video signal is produced by said image sensing circuit based on the regular signal charges output, converting the level into a focus evaluating value an absolute value of which attains a maximum value at an in-focus position, and sequentially supplying the focus evaluating value, and control means (6, 7, 8, 10, 13, 14) responsive to said supplied focus evaluating value for driving said relative position changing means so as to move the relative position of said focusing lens to the position where the absolute value of said focus evaluating value attains its maximum value.

* * * * *